United States Patent
Hatano et al.

[11] Patent Number: 5,191,500
[45] Date of Patent: Mar. 2, 1993

[54] POWER SUPPLY CIRCUIT FOR AN AUTOMOBILE

[75] Inventors: Rikuo Hatano; Yoshifumi Iwata, both of Aichi, Japan

[73] Assignee: Aisin Seiki K.K., Kariya City, Japan

[21] Appl. No.: 580,453

[22] Filed: Sep. 11, 1990

[30] Foreign Application Priority Data

Sep. 12, 1989 [JP] Japan ................... 1-236375

[51] Int. Cl.$^5$ ............................................. H02J 9/00
[52] U.S. Cl. ..................................... 361/64; 307/10.1
[58] Field of Search ........................... 307/64–66, 307/10.1, 10.7, 9.1; 455/343, 345

[56] References Cited

U.S. PATENT DOCUMENTS 4,005,344  6/1975  Gaind et al. ................ 317/31
4,010,381  4/1975  Fickenscher ............... 309/66
4,237,385  11/1978  Jurgens et al. ............. 307/66

Primary Examiner—A. D. Pellinen
Assistant Examiner—Aditya Krishnan
Attorney, Agent, or Firm—Sughrue, Mion, Zinn, Macpeak & Seas

[57] ABSTRACT

A power supply circuit for an automobile including an electric automotive appliance having a memory, a main battery, a backup battery, an ignition key switch, a battery switching circuit for connecting one of the main and backup batteries to the electric automotive appliance, a power detector for detecting a charged power in the backup battery, a limiting circuit for limiting the operation of the electric automobile appliance to only a power backup of the memory, and a control circuit for activating the limiting circuit when a charged power in the backup battery is detected to be below a predetermined level.

12 Claims, 1 Drawing Sheet

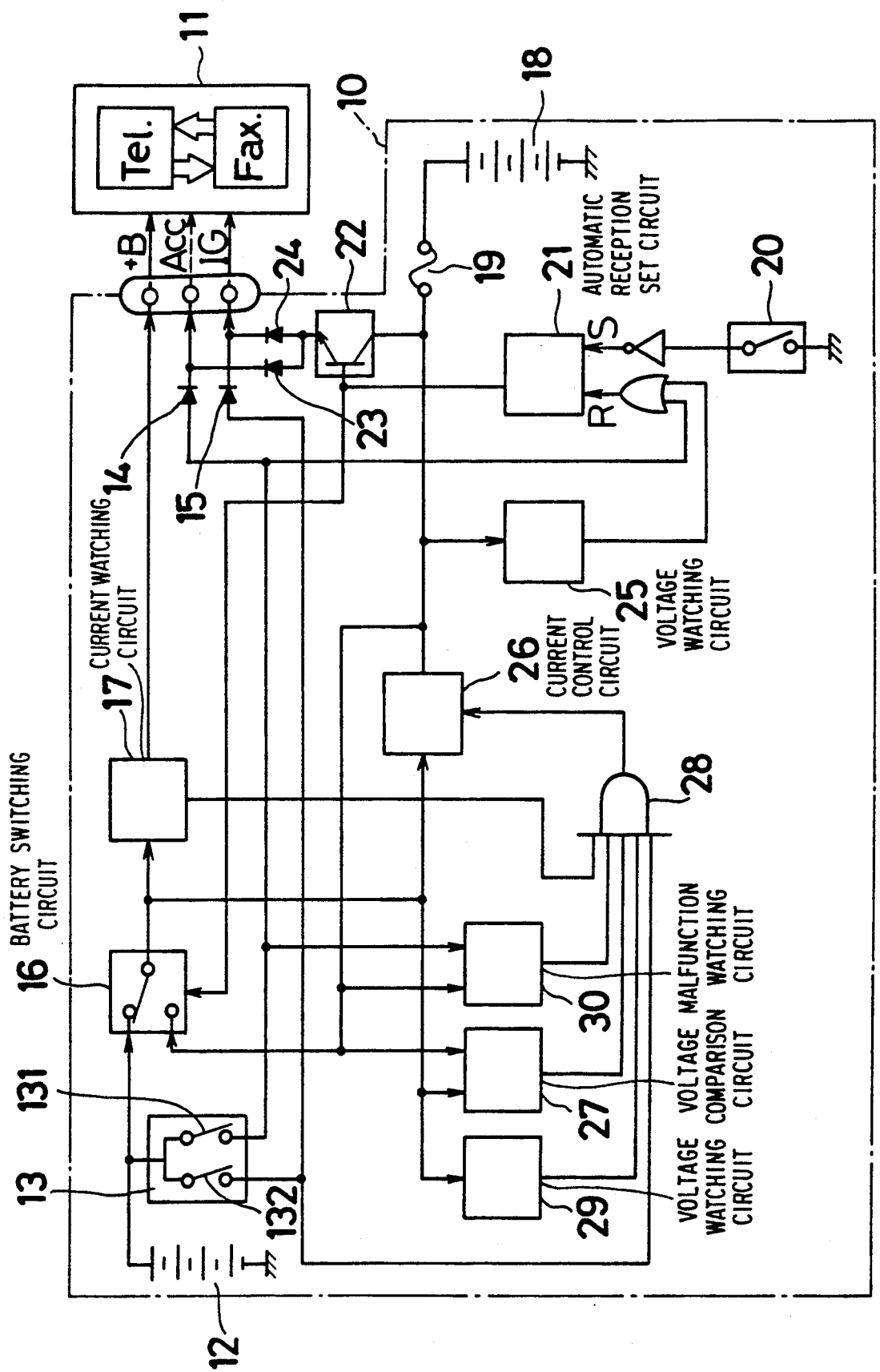

POWER SUPPLY CIRCUIT FOR AN AUTOMOBILE

FIELD OF THE INVENTION

This invention relates to a power supply circuit for an automobile, and in particular, to a power supply circuit for an electric automotive appliance which has a battery-backed memory to keep information.

BACKGROUND OF THE INVENTION

A conventional power supply device is shown in Japanese Patent Laid-Open 60 (1985) - 144730. This power supply device has a main battery and a backup battery. While the ignition switch is on, the main battery supplies power to automotive electric appliances. When the ignition switch is off, the backup battery supplies power. The backup battery is charged by the main battery. In this power supply device, if the charged power in the backup battery drops when the ignition switch is off, the power supplied to the automotive electric appliances decreases, and therefore the appliances may not work properly. If the power drops to a very low level, the memory of an appliance may lose its stored information.

SUMMARY OF THE INVENTION

An object of the present invention is to provide an improved power supply circuit in order to obviate the above-mentioned drawbacks, and in particular, to provide a power supply circuit which can supply power to an automotive electric appliance even if a backup battery goes down.

In accordance with this invention, a power supply circuit for an automobile comprises an electric automotive appliance having a battery-backed memory, a main battery which supplies power to the electric automotive appliance, a backup battery which supplies power to the electric automotive appliance, an ignition key switch which is connected between the main battery and the electric automotive appliance, a battery switching circuit means for connecting the main battery or the backup battery to the electric automotive appliance in accordance with the condition of the ignition key switch, a power detecting means for detecting a charged power in the backup battery, an operation limitation means for limiting operations of said electric automotive appliance only to operation of the memory, a control circuit means for activating the operation limitation means when the power detecting means detects that a charged power in the backup battery falls below a predetermined level.

In accordance with this invention, when the charged power of the backup battery decreases, the electric automotive appliance is connected to the main battery. Therefore, the backup of the memory is guaranteed by the power of the main battery.

BRIEF DESCRIPTION OF THE DRAWINGS

The objects and advantages of the invention will become apparent from the following detailed description of a preferred embodiment thereof in connection with the accompanying drawing in which;

the sole FIGURE is a block diagram of a power supply circuit, in accordance with the present invention.

DETAILED DESCRIPTION OF A PREFERRED EMBODIMENT OF THE INVENTION

As shown in the figure, this embodiment shows a power supply circuit 10 for an automobile telephone 11. The automobile telephone 11 is mounted on an automobile as one of the electric automotive appliances. In this embodiment, the automobile telephone 11 has a facsimile operation as well as a conventional telephone operation. The telephone 11 is connected to three power lines +B, Acc and IG. The telephone 11 receives power supplied through the line +B, and the telephone 11 operates only when power is supplied by either the line Acc or the line IG. If power is not supplied through either line Acc or IG, then the telephone 11 works only as a backup of the memory in order to keep the information, such as speed dial numbers and security codes, in the memory. Since this kind of telephone has beer: sold broadly, a detailed explanation of the telephone 11 will be omitted.

Referring to the figure, a main battery 12 is connected to an ignition key switch 13. The ignition key switch 13 has accessary contact 131 and an ignition contact 132. The accessary contact 131 supplies power to an electric automotive appliance such as a radio. The ignition contact 132 supplies power to an engine ignition to start the engine. Due to a mechanical construction of the ignition key switch 13, the accessary contact 131 alone can be closed, however, contact 132 can be closed only after the accessary contact 131 is closed. The ignition contact 132 can be opened alone; however, the accessary contact 131 can be opened only after the ignition contact 132 is opened. When the accessary contact 131 and the ignition contact 132 are closed, power is supplied to the lines Acc and IG through diodes 14 and 15, respectively.

A battery switching circuit 16 is connected to the main battery 12. When the battery switching circuit 16 switches to the main battery 12, power from the main battery 12 is supplied to the line +B of the telephone 11 through a current watching circuit 17. Thus when either the accessary contact 131 or the ignition contact 132 is closed, the telephone 11 works normally. When both the accessary contact 131 and the ignition contact 132 are opened, the operations of the telephone are limited only to a backup of the memory contained therein.

It is convenient to receive a facsimile transmission even when the driver, is away from the automobile. In order to operate such an automatic reception, power needs to be supplied to the line +B and either the line Acc or the line IG, though the accessary contact 131 and the ignition contact 132 are both opened. In general, it consumes a large amount of power to print out a received signal by a facsimile. It is important to prevent the main battery from discharging too much so that the main battery maintains enough power to start the engine. In this embodiment, power for the automatic reception of the facsimile is provided by the backup battery 18 in order to prevent the power from the main battery 12 from decreasing to a prohibited low amount.

The power charged in the backup battery 18 is supplied to the battery switching circuit 16 through a fuse 19. When the driver sets an automatic reception switch 20, an automatic reception set circuit 21 is changed into a set condition. The battery switching circuit 16 switches to the backup battery 18 so that the backup battery 18 is connected to the line +B. At the same time, a switching circuit 22 turns on so the power from the backup battery 18 is supplied to the lines Acc and IG through diodes 23 and 24, respectively. Thus the telephone is set to operate and the facsimile can receive a transmission.

As mentioned above, a large amount of power consumption is required to receive a facsimile transmission, and the power of the backup battery 18 rapidly decreases by each such reception. The power supply circuit 10 includes a voltage watching circuit 25. The voltage watching circuit 25 detects a voltage of the backup battery 18. When a voltage of the backup battery 18 drops to below a predetermined voltage, e.g., 10 V, the voltage watching circuit 25 resets the automatic reception set circuit 21. Thus, if the voltage of the backup battery drops to below the predetermined voltage, the battery switching circuit 16 turns into the main battery 12 and the switching circuit 22 is turned off. The power is neither supplied to the line Acc nor the line IG, the telephone 11 operates only for a memory backup using a power supplied from the main battery 12 through the line +B. The energy consumption for the memory backup is relatively small so the main battery 12 can supply a power to the telephone 11 to keep a memory backup for a long time.

A circuit for recharging the backup battery 18 will be explained. As to the main battery, it is explained in many books so that will not be explained.

When the driver operates the ignition key 13 to start the engine, the accessary contact 131 is closed first. The power supplied from the main battery 12 to the line Acc resets the automatic reception circuit 21. Then the battery switching circuit 16 turns into the main battery 12 and the switching circuit 22 is turned off. The telephone 11 can operate by the power supplied by the main battery 12. The backup battery 18 is ready for recharge. The backup battery 18 is recharged by a current control circuit 26 which is connected to the battery switching circuit 16. In order to prevent overheating of the backup battery 18 while the gate circuit 28 is opened, the current control circuit 26 controls a recharging current within an appropriate level. A voltage watching circuit 29 is set for preventing the backup battery 18 from being over recharged. The voltage watching circuit 29 detects an output voltage of the battery switching circuit 16 when the battery switching circuit 16 is switched to the backup battery 18. When the voltage watching circuit 29 detects that an output voltage of the backup battery 18 is greater than a predetermined voltage, e.g., 11 V, the voltage watching circuit 29 closes an AND gate 28. When the AND gate 28 is closed, the current control circuit 26 is disconnected and the recharge of the backup battery 18 is stopped. While the recharge of the backup battery 18 is going on, a voltage of the backup battery 18 becomes close to a voltage of the main battery 12. If a voltage of the main battery 12 drops by accident, current flows from the backup battery 18 to the main battery 12. This causes the backup battery 18 to discharge it's power. In order to prevent this discharge of the backup battery 18, a voltage comparison circuit 27 is connected to the backup battery 18. The voltage comparison circuit 27 compares an output voltage of the battery switching circuit 16 to an output voltage of the backup battery 18. When the voltage comparison circuit 27 detects that an output voltage of the backup battery 18 becomes close to an output voltage of the battery switching circuit 16, the voltage comparison circuit 27 closes the AND gate 28. When the AND gate 28 is closed, the current control circuit 26 is disconnected so that the current flow from the backup battery 18 to the main battery 12 is prevented.

As mentioned above, a large amount of power is required to print out received information from the facsimile. If the facsimile prints out during recharging of the backup battery 18, then a load to the main battery 12 becomes too large. To prevent this over load to the main battery 12, a current watching circuit 17 is provided. The current watching circuit 17 stops recharge of the backup battery 18 while a load to the main battery 12 is too large. The current watching circuit is connected between the battery switching circuit 16 and the telephone 11. The current watching circuit 17 detects current flowing into the telephone 11. When the current watching circuit 17 detects that a current is greater than a predetermined level, the current watching circuit 17 closes the AND gate 28 so that the current control circuit 26 is disconnected. Therefore, in accordance with the power supply circuit 10 of this embodiment, a load to the main battery 12 caused by a recharge of the backup battery 18 is limited so that the main battery 12 is prevented from discharging too much. If a short occurs at the backup battery 18, the backup battery 18 may be over heated when a recharge is conducting. To prevent this problem, a malfunction watching circuit 30 is connected to the backup battery 18. The malfunction watching circuit 30 detects that an output voltage of the backup battery 18 is less than a predetermined voltage, e.g., 9 V, the malfunction watching circuit 30 closes the AND gate 28 so that the current control circuit 26 is disconnected.

As explained above, the power supply circuit 10 includes the battery switching circuit 16 which connects either the main battery 12 or the backup battery 18 to the telephone 11 in accordance with the ignition key switch 13, the voltage watching circuit 25 which detects a charged power in the backup battery 18, the switching circuit 22 which connects the backup battery 18 to the telephone 11 and limits the telephone operations only to the memory backup when the voltage watching circuit 25 detects that the backup battery 18 discharges, and the automatic reception set circuit 21. When a power of the backup battery 18 drops, the telephone 11 is connected to the main battery 12 and is limited in its operation only to a memory backup. Thus a memory backup is always guaranteed.

Although the invention has been described in connection with a preferred embodiment thereof, it will be appreciated by those skilled in the art that additions, substitutions, modifications, and deletions not specifically described, may be without departing from the spirit and scope of the invention as defined in the appended claims.

What is claimed:

1. A power supply circuit for an automobile comprising:
    an electric automotive appliance;
    a main battery for supplying power to said electric automotive appliance;
    a backup battery for supplying power to said electric automotive appliance;
    an ignition key switch connected between said main battery and said electric automotive appliance;
    battery switching circuit means for connecting one of said main battery and said backup battery to said electric automotive appliance in accordance with a condition of said ignition key switch;

power detecting means for detecting a charged power in said backup battery;

operation limitation means for limiting an operation of said electric automotive appliance to substantially reduce an amount of power required by said electric automotive appliance; and control unit means for activating said operation limitation means when said power detecting means detects that a charged power in said backup battery is below a predetermined level.

2. The power supply circuit as defined in claim 1, wherein said control circuit means activates said operation limitation means when said power detecting means detects that the charged power in said backup battery is below the predetermined level and further causes said battery switching means to connect said main battery to said electric automotive appliance.

3. The power supply circuit as defined in claim 1, further comprising current control circuit means, coupled between said battery switching means and said backup battery, for controlling recharging of said backup battery by said main battery, in accordance with a control signal.

4. The power supply circuit as defined in claim 3, further comprising control signal generating means for supplying a control signal to said current control circuit means, said current control circuit means being disabled so as to prevent recharging of said backup battery when the supplied control signal has a predetermined value.

5. The power supply circuit as defined in claim 4, wherein said control signal generating means includes voltage comparison circuit means for comparing a voltage of said backup battery with a voltage of said main battery, and for causing said control signal generating means to supply the control signal having the predetermined value if the respective voltages of said main and backup batteries are equal.

6. The power supply circuit as defined in claim 4, wherein said control signal generating means includes a malfunction watching circuit for detecting a voltage of said backup battery, and for causing said control signal generating means to supply the control signal having the predetermined value when the detected voltage of said backup battery is below a predetermined voltage level.

7. The power supply circuit as defined in claim 4, further comprising current watching circuit means for detecting a load on said electric automotive appliance, and for causing said control signal generating means to supply the control signal having the predetermined value when the detected load is above a predetermined value.

8. The power supply circuit as defined in claim 4, wherein said control signal generating means includes a voltage watching circuit means for detecting an output voltage of said backup battery, and for causing said control signal generating means to supply the control signal having the predetermined value when the detected output voltage is greater than a predetermined voltage value.

9. The power supply circuit as defined in claim 1, wherein said control circuit means includes a RS flip-flop latch.

10. The power supply circuit as defined in claim 1, wherein said operation limitation means includes a transistor having its emitter coupled to said electric automotive appliance, its base coupled to said battery switching circuit means and to said control circuit means, and its collector coupled to said backup battery.

11. The power supply circuit as defined in claim 1, wherein said electric automotive appliance includes a memory, and wherein said operation limitation means limits the operation of said electric automotive appliance to only operation of said memory, thereby substantially reducing the amount of power required by said electric automotive appliance.

12. The power supply circuit as defined in claim 1, wherein said electric automotive appliance is a telephone having means for receiving/transmitting a facsimile.

* * * * *